United States Patent
Matsumori et al.

(10) Patent No.: US 8,259,268 B2
(45) Date of Patent: Sep. 4, 2012

(54) POLARIZER AND LIQUID CRYSTAL DISPLAY

(75) Inventors: Masaki Matsumori, Naka-gun (JP); Yasushi Tomioka, Hitachinaka (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 577 days.

(21) Appl. No.: 12/540,421

(22) Filed: Aug. 13, 2009

(65) Prior Publication Data

US 2010/0073609 A1   Mar. 25, 2010

(30) Foreign Application Priority Data

Sep. 22, 2008 (JP) ................................ 2008-242280

(51) Int. Cl.
  *G02F 1/1337* (2006.01)
  *G02F 1/1335* (2006.01)
  *G02F 1/1343* (2006.01)

(52) U.S. Cl. .......... 349/123; 349/96; 349/126; 349/141; 349/114

(58) Field of Classification Search .............. 349/123, 349/96, 126, 141, 114
See application file for complete search history.

(56) References Cited

U.S. PATENT DOCUMENTS

| 6,090,909 A | 7/2000 | Kato et al. |
| 6,686,980 B1 * | 2/2004 | Ichihashi ......................... 349/96 |
| 2003/0107692 A1 * | 6/2003 | Sekiguchi .................... 349/113 |
| 2010/0267858 A1 * | 10/2010 | Lub et al. ..................... 522/108 |
| 2010/0309415 A1 * | 12/2010 | Rho et al. ....................... 349/96 |

FOREIGN PATENT DOCUMENTS

| JP | 09-197125 | 7/1997 |
| JP | 11-160538 | 6/1999 |
| JP | 11-236451 | 8/1999 |
| JP | 2001-133630 | 5/2001 |
| JP | 2001-330726 | 11/2001 |

* cited by examiner

*Primary Examiner* — Mike Qi
(74) *Attorney, Agent, or Firm* — Antonelli, Terry, Stout & Kraus, LLP.

(57) ABSTRACT

Provided are a polarizer having high in-plane uniformity and high heat resistance, and a liquid crystal display (LCD) using the polarizer and having the following characteristics: the LCD is excellent in mass productivity, has the contrast ratio being improved, and has high image quality. The LCD includes: a pair of substrates at least one of which is transparent; a liquid crystal layer placed between the pair of substrates; an electrode group for applying an electric field to the liquid crystal layer, the electrode group being formed on at least one substrate of the pair of substrates; multiple active elements connected to the electrode group; and an alignment control film placed on at least one substrate of the pair of substrates, in which the molecules of a dichroism pigment aligned on at least one surface of the alignment control film and the dichroism pigment are cross-linked with a crosslinkable monomer.

11 Claims, 4 Drawing Sheets

POLARIZER AND LIQUID CRYSTAL DISPLAY

CROSS-REFERENCE TO RELATED APPLICATION

The present application claims priority from Japanese application JP 2008-242280 filed on Sep. 22, 2008, the content of which is hereby incorporated by reference into this application.

BACKGROUND OF THE INVENTION

1. Field of the Invention

The present invention relates to a polarization element (polarization plate) and a liquid crystal display using the polarization element (polarization plate).

2. Description of the Related Art

A liquid crystal display has been finding use in an expanded variety of applications because of its merits such as high display quality, a small thickness, and low power consumption.

With the advent of a recent expansion of the applications of the liquid crystal display ranging from monitors for portable devices such as a monitor for a portable phone and a monitor for a digital still camera to monitors for desktop personal computers, monitors for printing and designing, medical monitors, and furthermore, liquid crystal television sets, there have been growing requests for good color reproducibility and a high contrast ratio.

In particular, extremely high emphasis has been placed on the representation of a black color in a liquid crystal television set, and high luminance has been strongly requested of the liquid crystal television set.

The acquisition of a liquid crystal display having a high contrast ratio and high image quality requires the application of a polarization plate having a high degree of polarization and high in-plane uniformity.

A pair of, for example, iodine polarizers each obtained by impregnating polyvinyl alcohol with an iodine complex or dye polarizers each obtained by impregnating stretched polyvinyl alcohol with a dichroism dye has been currently available as a pair of polarization plates to be used in the liquid crystal display.

Further, in addition to those conventional polarization plates, inventions each relating to the acquisition of a polarization element (polarization plate) by the alignment of the molecules of a dichroism pigment have been disclosed (see, for example, Japanese Patent Application Laid-open Publication No. 2001-330726 and Japanese Patent Application Laid-open Publication No. HEI 9-197125).

SUMMARY OF THE INVENTION

Although the pair of iodine polarizers or dye polarizers has a high degree of polarization, it cannot be said that the pair alone suffices to satisfy a contrast ratio recently requested of a liquid crystal display.

In addition, Japanese Patent Application Laid-open Publication No. 2001-330726 and Japanese Patent Application Laid-open Publication No. HEI 9-197125 each disclose an invention relating to a polarization plate produced by aligning the molecules of a dichroism pigment. However, the use of the polarization plate in a liquid crystal display involves problems in terms of heat resistance, in-plane uniformity, and productivity.

In ordinary cases, a production process for a liquid crystal display includes multiple steps where materials and components for the liquid crystal display are exposed to high temperatures, and the liquid crystal display always receives heat from a backlight as a light source and external heat generated by the environment where the liquid crystal display is used.

The application of such polarization plate as disclosed in Japanese Patent Application Laid-open Publication No. 2001-330726 or Japanese Patent Application Laid-open Publication No. HEI 9-197125 to a liquid crystal display involves the following problem: the alignment of the molecules of the dichroism pigment is disturbed by the thermal motions of the molecules, so the contrast ratio of the liquid crystal display reduces.

In addition, a substrate of the liquid crystal display has a fine step difference due to, for example, an electrode, and the application of an application type polarization plate to the substrate with a step difference shape involves the following problem: the alignment of the molecules of the dichroism pigment is disturbed by the step difference structure of the substrate, so the polarization plate cannot secure in-plane uniformity.

An object of the present invention is to provide an application type polarizer having high heat resistance and being excellent in in-plane uniformity and productivity, and a high-quality liquid crystal display using the application type polarizer.

In order to solve the above-mentioned problems, a polarizer according to the present invention includes: an alignment film containing a dichroism pigment and a crosslinkable monomer and obtained by subjecting molecules of the dichroism pigment in aligned states to one of cross-linking with the crosslinkable monomer and polymerization; and a substrate on which the alignment film is formed.

In addition, in order to solve the above-mentioned problems, a liquid crystal display according to the present invention includes: a pair of substrates at least one of which is transparent; a liquid crystal layer placed between the pair of substrates; an electrode group for applying an electric field to the liquid crystal layer, the electrode group being formed on at least one substrate of the pair of substrates; multiple active elements connected to the electrode group; and an alignment control film placed on at least one substrate of the pair of substrates, in which the liquid crystal display is obtained by cross-linking molecules of a dichroism pigment aligned on at least one surface of the alignment control film with a crosslinkable monomer.

According to the present invention, the application type polarizer having high heat resistance and being excellent in in-plane uniformity and productivity, and the high-quality liquid crystal display using the application type polarizer can be provided.

DETAILED DESCRIPTION OF THE INVENTION

Figure 1:
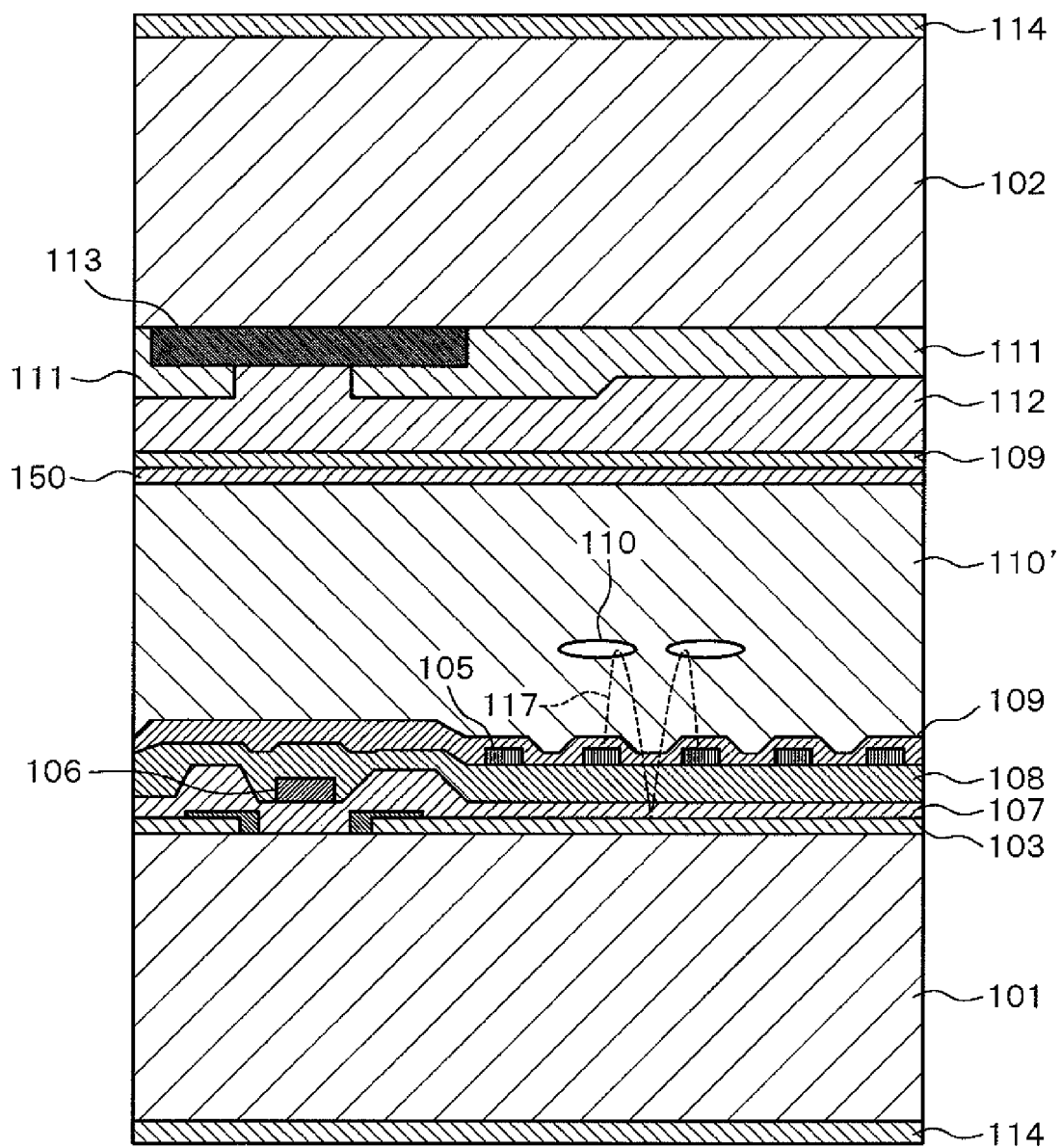
FIG. 1 is a schematic sectional view of a pixel portion of a transmissive liquid crystal display according to the present invention.

A polarizer according to the present invention is characterized in that an alignment control film is formed on a transparent substrate, and that the molecules of a dichroism pigment are aligned by the alignment control film.

As a result, the polarizer can obtain uniform alignment and a uniform degree of polarization over a large area.

The polarizer according to the present invention is characterized in that a crosslinkable monomer is added to the dichroism pigment to cross-link the molecules of the dichroism pigment.

As a result, the molecular motion of the dichroism pigment due to heat can be suppressed, and the alignment of the molecules of the dichroism pigment is not disturbed, so the heat resistance of the polarizer can be improved.

Although a transparent substrate to be used in the present invention is not particularly limited, a material showing a high transmittance for light having a wavelength of 380 to 780 nm, excellent in mechanical strength and dimensional stability, and having good heat resistance is suitable.

As the transparent substrate, there can be used: plastic materials such as polyethylene terephthalate (PET), polyethylene naphthalate (PEN), polyarylate (PAR), polyethersulfone (PES), acetyl cellulose, triacetyl cellulose (TAC), a polyimide resin, an acrylic resin, a polyester resin, a polycarbonate resin, and a cyclic polyolefin resin; and inorganic materials such as a soda glass, an alkali-free glass, a borosilicate glass, and quartz.

The transmittance of a plastic substrate or plastic film substrate for light having a wavelength of 380 to 780 nm falls within the range of preferably 70 to 100%, more preferably 85 to 100%, or particularly preferably 90 to 100%.

A plastic film to be used in the present invention may be a single-layer film, or may be a multilayer film obtained by combining two or more layers.

In addition, the transparent substrate is more preferably a retardation film having birefringence because the view angle characteristic of a liquid crystal display using the polarizer can be improved.

The dichroism pigment according to the present invention is characterized in that the dichroism pigment has a substituent such as a hydroxyl group, amino group, carboxyl group, or sulfo group capable of reacting with the crosslinkable monomer.

For example, a poly-azo direct dye, a benzidine pigment, a diphenyl urea pigment, a stilbene pigment, adinaphthylamine pigment, a J-acid pigment, and an anthraquinone pigment are given. More specifically exemplified are C.I. Direct Yellow 12, 26, 44, and 50, C.I. Direct Orange 39, 41, 49, and 72, C.I. Direct Red 2, 23, 28, 31, 37, 39, 79, 81, 83, and 89, C.I. Direct Violet 9, 12, and 48, C.I. Direct Blue 1, 15, 22, 67, 78, 83, 90, 151, 168, and 202, C.I. Direct Green 1, 51, 59, and 85, C.I. Direct Black 17, Methyl Orange, Brilliant Yellow, Modern Yellow 10, Acid Red 37 and 97, C.I. Disperse Red 60, C.I. Disperse Blue 214, and C.I. Disperse Yellow 56.

In addition, the dichroism pigment according to the present invention is more preferably a pigment showing liquid crystallinity by itself or when aggregated with each other.

The crosslinkable monomer to be used in the present invention is characterized in that the crosslinkable monomer is a polyfunctional monomer having two or more thermal cross-linking groups such as an epoxy group, or two or more photo cross-linking groups such as a vinyl group, an acrylic group, and a methacrylic group.

When the crosslinkable monomer is used in the liquid crystal display, the crosslinkable monomer is particularly preferably a photo cross-linking monomer because the monomer can be subjected to photo patterning in the plane of the polarizer.

A photo cross-linking reaction or thermal cross-linking reaction for the crosslinkable monomer is not particularly limited, and a photo cross-linking reaction or thermal cross-linking reaction and a compound described in, for example, "Photo-curable Material—Production Technique and Development of Applications—" (TORAY RESEARCH CENTER, Inc.) or "Crosslinking and Degradation of Polymers for Sustainable Chemistry" (CMC Publishing Co., Ltd.) can be used.

Examples of the photo cross-linking reaction and the compound therefor include: a radical polymerization reaction caused by (meta)acryl, styrene, and maleimide; an ene-thiol reaction caused by a multivalent thiols/vinyl compound; a cation polymerization reaction caused by epoxy, oxetane, and vinylether; an anion polymerization reaction caused by epoxy; and a photodimerization reaction caused by a substituted maleimide. Examples of the thermal cross-linking reaction and the compound therefor include: an acid catalyst cross-linking reaction caused by melamine and epoxy; an addition reaction to SiH caused by a terminal vinyl compound; a siloxane condensation reaction caused by alkoxysilane; a urethane formation reaction caused by isocyanate; and an oxidation reaction of an allyl group oxygen caused by an allyl compound.

As a photopolymerizable group, there are particularly exemplified an acryloyl group, a methacryloyl group, an acrylamide group, maleic acid diester, an allyl group, a vinylether group, a vinylthioether group, a vinylamino group, a glycidyl group, and an acetylenic unsaturated group.

The crosslinkable monomer according to the present invention is preferably a compound having two or more photo- or thermo-polymerizable sites of such kinds.

To be specific, the crosslinkable monomer is preferably a compound represented by the following general formula (1).

$$B1-A1-X-A2-B2 \quad (1)$$

Provided that X is characterized by representing a single bond or a divalent hydrocarbon group such as: an alkylene group having 1 to 20 carbon atoms, e.g., a methylene group, an ethylene group, a propylene group, a pentamethylene group, or a heptylene group; a cycloalkylene group having 3 to 20 carbon atoms, e.g., a cyclopropylene group, a cyclopentylene group, or a cyclohexylene group; or an arylene group having 6 to 20 carbon atoms, e.g., a phenylene group or a naphthylene group.

Further, A1 and A2 are each characterized by independently representing a single bond, —O—, —CO—O—, —OCO—, —NHCO—, —NHCO—O—, or —OCONH—.

Further, B1 and B2 are each characterized by independently representing a (meta)acryloyl group, a (meta)acryloyloxy group, a (meta)acrylamide group, a carboxylic group, a vinyl group, a vinyloxy group, an azido group, a chloromethyl group, an epoxy group, an oxetane group, or a maleimide group, and specifically, characterized by representing the following structure group B, provided that n represent an arbitrary number.

[Structure Group B]

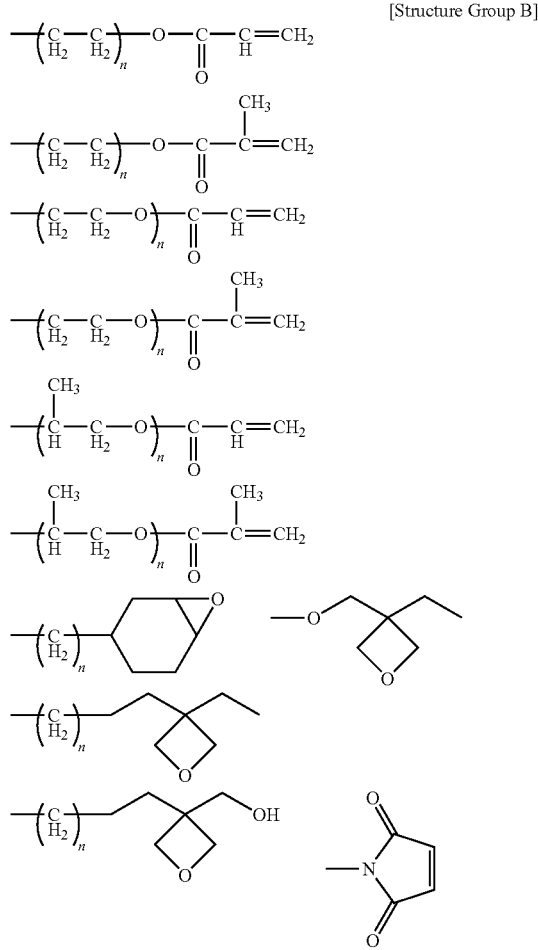

The polarizer according to the present invention is characterized in that the polarizer is obtained by: applying, onto the alignment control film, a solution prepared by dissolving the dichroism pigment and the crosslinkable monomer in a proper solvent; and drying the applied solution.

The concentration of the dichroism pigment falls within the range of preferably 0.1 to 30 wt %, or particularly preferably 0.3 to 10 wt %.

The solvent is not particularly limited, and examples thereof include: water; N-methyl-2-pyrrolidinone (NMP); butyl cellosolve; phenyl cellosolve; γ-butyrolactone; N,N-dimethylformamide (DMF); N,N-diethylformamide; dimethylsulfoxide (DMSO); toluene; tetrahydrofuran; chlorobenzene; dimethylacetamide; glycols such as ethylene glycol, propylene glycol, and dipropylene glycol monomethyl ether; and alcohols such as methanol, ethanol, isopropyl alcohol, and butanol. Of those, NMP, butyl cellosolve, γ-butyrolactone, and water are preferred because of their good coating properties.

The solution used for producing the polarizer according to the present invention is characterized in that a polymerization initiator is added to the solution.

Although the polymerization initiator is not particularly limited, a polymerization initiator adapted for each polymerization reaction described in, for example, "Photo-curable Material—Production Technique and Development of Applications—" (TORAY RESEARCH CENTER, Inc.) or "Crosslinking and Degradation of Polymers for Sustainable Chemistry" (CMC Publishing Co., Ltd.) is desirably used.

Examples of the photopolymerization initiator include benzophenone, an ortho-benzoin methyl benzoate (OBM) benzophenone derivative, 4-benzoyl-4'-methyldiphenylsulfide (DMS), ammonium salt-type benzophenone, thioxanthone, isopropylthioxanthone, diethylthioxanthone, a thioxanthone derivative, ammonium salt-type thioxanthone, a benzoin derivative, benzildimethylketal (BDK), α-hydroxyalkylphenone, α-aminoalkylphenone, an acylphosphine oxide (APO), a monoacylphosphine oxide (MAPO), a bisacylphosphine oxide (BAPO), alkylphenyl glyoxylate (AFG), diethoxyacetophenone (DEAP), and a titanocene compound (TICP).

The alignment control film to be used in the present invention is characterized in that the alignment control film is subjected to a rubbing alignment treatment or a photo alignment treatment.

The photo alignment treatment is particularly preferable to the rubbing alignment treatment because the photo alignment treatment can uniformly align the molecules of the dichroism pigment without any alignment unevenness.

In addition, the alignment control film is characterized in that, when the polarizer according to the present invention is used in the liquid crystal display, the alignment control film on the substrate serves also as a planarizing layer by the following procedure: the alignment control film is formed so as to have a thickness equal to or larger than the step difference of the substrate.

As a result, the disturbance of the alignment of the molecules of the dichroism pigment due to the step difference of the substrate can be avoided.

A photo alignment control film according to the present invention is not particularly limited, and a photo alignment control film of any one of the following reaction types based on irradiation with linearly polarized light or with obliquely unpolarized light can be used: a photoisomerization type, a photodimerization type, a photo cross-linking type, a photocyclization type, a photodecomposition type, and a photodecomposition-bonding type.

Of those, a photo cross-linking type, photodecomposition type, or photodecomposition-bonding type photo alignment film is preferable, and furthermore, a photodecomposition-bonding type photo alignment control film made of a cyclobutane polyimide is the most preferably used in the liquid crystal display because of its excellent heat stability.

Extensive investigations conducted by the inventors of the present invention have found that the contrast ratio of the liquid crystal display can be improved by providing a polarization plate 114 of the liquid crystal display at a position as close as possible to the liquid crystal layer of the liquid crystal display.

That is, the amount of a light-scattering substance that reduces the degree of polarization of polarized light such as a color filter between a pair of polarization plates is desirably as small as possible in order that the contrast ratio of the liquid crystal display may be improved.

Therefore, the following procedure is extremely effective in improving the contrast ratio: the polarizer (polarization plate 114) of the liquid crystal display is not formed outside a liquid crystal panel (outside a pair of transparent substrates) unlike the conventional procedure, but is formed inside the liquid crystal panel (inside the pair of transparent substrates) to serve as a built-in polarizer (built-in polarization plate 150).

However, the production of the liquid crystal panel involves a process for heating a substrate to a high temperature, so the following problem arises: the alignment of the molecules of a conventional low-molecular weight dichroism pigment is disturbed by the heating process, with the result that the contrast ratio of the liquid crystal display reduces.

The polarizer according to the present invention can maintain the alignment of the molecules of its dichroism pigment by virtue of cross-linking, so the polarizer can prevent the disturbance of the alignment due to heat. As a result, a high-quality liquid crystal display can be provided.

The built-in polarizer (built-in polarization plate 150) of the liquid crystal display according to the present invention is characterized in that the built-in polarizer serves also as an alignment control film for aligning liquid crystal molecules.

As a result, the number of production steps for the liquid crystal display and a cost for the production of the liquid crystal display can be reduced.

The deviation of the direction in which the liquid crystal molecules are aligned from the polarization axis of the polarizer in the liquid crystal display reduces the contrast ratio.

Since the polarization plate 114 is attached to the outside of the liquid crystal panel in a conventional liquid crystal display, the deviation of the polarization axis of the polarization plate from a liquid crystal alignment axis is inevitable. In the liquid crystal display according to the present invention, however, the alignment control film serving as the built-in polarizer (built-in polarization plate 150) arranges the liquid crystal molecules, whereby the direction in which the liquid crystal molecules are aligned and the polarization direction of the built-in polarizer (built-in polarization plate 150) can be caused to coincide with each other perfectly. As a result, the liquid crystal display can obtain a high contrast ratio.

Specific examples are shown below. Although representative materials such as a dichroism pigment, a crosslinkable monomer, and an alignment control film were exemplified, an effect of the present invention was similarly observed in any other material.

EXAMPLE 1

Equal moles of 2,7-diaminofluorene and cyclobutane tetracarboxylic acid dianhydride were added to an NMP solvent, and the mixture was stirred while being cooled with water, whereby a cyclobutane polyamide acid solution was obtained.

The solution was applied by spin coating onto a glass substrate A subjected to UV/ozone cleaning, and the whole was heated at 220° C. for 30 minutes, whereby a substrate B on which a polyimide thin film had been formed was produced.

The polyimide thin film of the substrate B was subjected to a rubbing treatment in accordance with an ordinary method, whereby a substrate C was obtained.

In addition, a substrate D was produced by irradiating the surface of the polyimide thin film of the substrate B with polarized ultraviolet (UV) light.

A high-pressure mercury lamp was used as a light source. UV light having a wavelength in the range of 240 nm to 380 nm was extracted through an interference filter, and the extracted light was turned into linearly polarized light having a polarization ratio of about 10:1 with a pile-of-plates polarizer obtained by laminating quartz substrates. The surface of the polyimide thin film was irradiated with the linearly polarized light at an irradiation energy of about 5 J/cm$^2$.

An aqueous solution prepared by dissolving 5 wt % of C.I. Direct Blue 67 in a water solvent was applied to each of the four kinds of substrates A, B, C, and D thus obtained with a barcoater, and the whole was dried at a temperature of 40° C.

and a humidity of 70%, whereby polarization plates A-1, B-1, C-1, and D-1 corresponding to the substrates A to D were obtained.

The absorption axis of each of the polarization plates A-1 and B-1 was perpendicular to the direction in which the aqueous solution was applied with the barcoater. The absorption axis of the polarization plate C-1 was perpendicular to the rubbing direction. The absorption axis of the polarization plate D-1 was perpendicular to the polarization axis of the polarized UV with which the surface had been irradiated.

The polarized light absorption spectra of those polarization plates were measured, and the degree of polarization (dichroic ratio) of each of the polarization plates was calculated. As a result, the degrees of polarization of the polarization plates A-1, B-1, C-1, and D-1 at a wavelength of 500 nm were 15, 25, 23, and 22, respectively.

The polarization plates B-1, C-1, and D-1 were each superior to the polarization plate A-1 in polarization characteristic: each of the polarization plates B-1, C-1, and D-1 was free of unevenness over the entire surface of its substrate, and showed good in-plane uniformity. In particular, as compared to the polarization plate C-1, the polarization plate D-1 was free of unevenness due to a rubbing flaw, and showed good uniformity.

EXAMPLE 2

A solution prepared by adding 5 wt % of C.I. Direct Blue 67, 0.7 wt % of NK ester CB 1 (manufactured by Shin-nakamura Chemical Corporation) as a crosslinkable monomer to a mixed solvent of NMP, γ-butyrolactone, and water was applied to the substrates A, B, C, and D obtained in the same manner as in Example 1 with a barcoater, and the whole was dried at a temperature of 40° C. and a humidity of 70%. After that, the resultant was irradiated with UV light from a high-pressure mercury lamp at an irradiation energy of about 2 J/cm$^2$, whereby polarization plates A-2, B-2, C-2, and D-2 corresponding to the substrates A to D were obtained.

The polarized light absorption spectra of those polarization plates were measured, and the degree of polarization (dichroic ratio) of each of the polarization plates was calculated. As a result, the degrees of polarization of the polarization plates A-2, B-2, C-2, and D-2 at a wavelength of 500 nm were 13, 22, 24, and 21, respectively.

The polarization plates of Example 2 were heated in a thermostat at 150° C. for 2 hours together with the polarization plates of Example 1. After that, each of the polarization plates was evaluated for its degree of polarization (dichroic ratio) again. As a result, all the polarization plates according to Example 1 each showed a degree of polarization of 10 or less, which means that the degrees of polarization each reduced to a large extent. However, the polarization plates according to Example 2 each showed nearly no reduction in degree of polarization; the degrees of polarization of the polarization plates A-2, B-2, C-2, and D-2 were 12, 20, 24, and 20, respectively.

As a result, an improving effect of the crosslinkable monomer on the heat resistance of each polarization plate was observed.

EXAMPLE 3

A solution prepared by adding 5 wt % of C.I. Direct Blue 67, 0.9 wt % of 3,4-epoxycyclohexylmethyl-(3,4-epoxy)cyclohexane carboxylate as a crosslinkable monomer, and 0.3 wt % of an Irgacure 2959 (manufactured by Ciba Specialty Chemicals Inc.) as a photopolymerization initiator to a mixed solvent of NMP, γ-butyrolactone, and water was applied to the substrate D obtained in the same manner as in Example 1 with a barcoater, and the whole was dried at a temperature of 40° C. and a humidity of 70%. After that, the resultant was irradiated with UV light from a high-pressure mercury lamp at an irradiation energy of about 1 J/cm², whereby a polarization plate D-3 was obtained. In addition, a polarization plate D-3' was produced at the same time in exactly the same manner as that described above except that the photopolymerization initiator was not added.

The polarized light absorption spectra of the polarization plates D-3 and D-3' were measured, and the degree of polarization (dichroic ratio) of each of the polarization plates was calculated. As a result, the degrees of polarization of the polarization plates D-3 and D-3' at a wavelength of 500 nm were 25 and 27, respectively. Those polarization plates were heated in a thermostat at 150° C. for 2 hours, and were then each evaluated for its degree of polarization (dichroic ratio) again. As a result, the degrees of polarization of the polarization plates D-3 and D-3' were 24 and 19, respectively; in other words, the polarization plate D-3 to which the photopolymerization initiator had been added showed high heat resistance.

Hereinafter, a constitution when any such polarization plate as described above is applied to the liquid crystal display according to the present invention is specifically described.

Although a liquid crystal display according to an in-plane switching (IPS) mode is exemplified here, the polarization plate can exert a similar effect even when used in a liquid crystal display according to any one of the various display modes such as a twisted nematic (TN) mode, a vertical alignment (VA) mode, an optically compensated bend (OCB) mode, and an electrically controlled birefringence (ECB) mode as well as the IPS mode.

EXAMPLE 4

A specific constitution of a transmissive liquid crystal display according to the present invention is described with reference to FIGS. 1 and 2.

FIG. 1 is a schematic sectional view of a portion near one pixel for describing the liquid crystal display according to the present invention.

Figure 2:
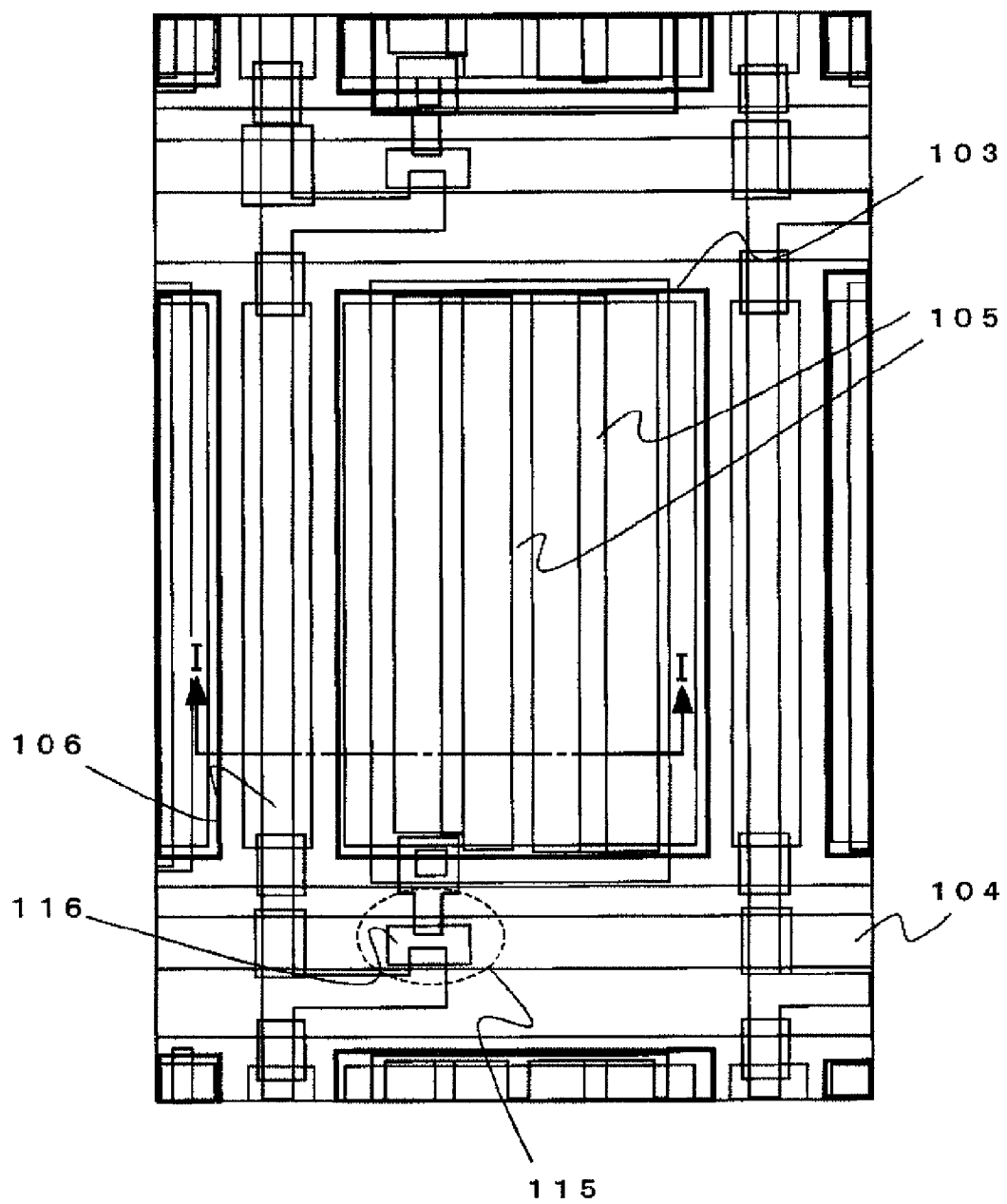
FIG. 2 is a schematic plan view of the pixel portion of the transmissive liquid crystal display according to the present invention.

In addition, FIG. 2 is a schematic view of an active matrix substrate for describing the constitution of the portion near one pixel for describing the liquid crystal display according to the present invention.

It should be noted that FIG. 1 schematically shows a sectional view taken along the line I-I of FIG. 2.

A glass substrate having a thickness of 0.7 mm and a polished surface is used as a substrate 101 in the production of the liquid crystal display of the present invention.

An insulating film 107 for preventing a short circuit in each of electrodes 103, 105, 106, and 104, a thin-film transistor 115, and a protective insulating film 108 for protecting the thin-film transistor 115, and electrodes 105 and 106 are formed on the substrate 101 so that a TFT substrate may be obtained.

The pixel electrode 105 and the common electrode 103 are each formed of ITO, and the common electrode 103 is constituted of a solid electrode covering nearly the entirety of the pixel.

FIG. 2 shows the structure of each of the thin-film transistor 115, and the electrodes 103, 105, and 106.

In FIG. 2, the thin-film transistor 115 is constituted of the pixel electrode 105, the signal electrode 106, the scanning electrode 104, and an amorphous silicon 116.

In addition, the scanning electrode 104 is formed by patterning an aluminum film, the signal electrode 106 is formed by patterning a chromium film, and each of the common electrode 103 and the pixel electrode 105 is formed by patterning ITO.

The insulating film 107 and the protective insulating film 108 were each composed of silicon nitride, and had thicknesses of 0.2 μm and 0.3 μm, respectively.

A capacitor element is formed to have such a structure that the insulating films 107 and 108 are sandwiched between the pixel electrode 105 and the common electrode 103.

The pixel electrode 105 is placed so as to overlap the upper layer of the solid-shaped common electrode 103. The number of pixels, which are constituted of the 1,024×3 (corresponding to R, G, and B) signal electrodes 106 and the 768 scanning electrodes 104, is 1,024×3×768.

A color filter 111 with a black matrix 113 was formed on a substrate 102, and the resultant was defined as a counter color filter substrate. An ITO 112 was formed into a film on the surface of the color filter.

Next, an alignment control film was formed as described below. A varnish using a polyamide acid ester represented by Chemical Formula 1 as a resin component was prepared so that the varnish might contain the resin component, DMF, γ-butyrolactone, and butyl cellosolve at concentrations of 5 wt %, 60 wt %, 20 wt %, and 15 wt %, respectively. The varnish was formed into a film by printing on the TFT substrate, and the film was imidated by a heat treatment, whereby a dense polyimide alignment control film 109 having an imidation ratio of about 80% and a thickness of about 110 nm was formed.

[Chemical Formula 1]

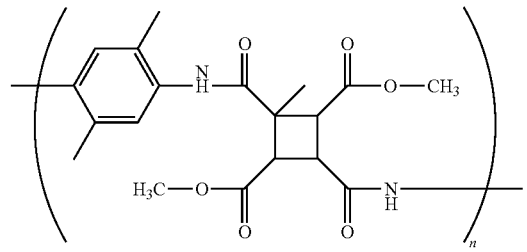

Similarly, the same polyamide acid ester varnish was formed into a film by printing also on the surface of the other glass substrate 102 on which the film of the ITO 112 had been formed. Then, the film of the varnish was imidated by a heat treatment, whereby another alignment control film 109 composed of a dense polyimide film and having an imidation ratio of about 80% and a thickness of about 110 nm was formed.

In order that a liquid crystal-aligning ability might be imparted to the surface of the polyimide alignment control film 109, the polyimide alignment control film 109 was irradiated with polarized ultraviolet (UV) light while the surface was irradiated with far-infrared rays.

A high-pressure mercury lamp was used as a light source. UV light having a wavelength in the range of 240 nm to 500 nm was extracted, and the extracted light was turned into linearly polarized light having a polarization ratio of about 10:1 with pile-of-plates polarizer obtained by laminating quartz substrates. The alignment control film was irradiated with the linearly polarized light at an irradiation energy of about 2.5 J/cm². The temperature of the alignment control film at that time was about 180° C.

Next, a solution prepared by adding 8 wt % of C.I. Direct Blue 67, 0.7wt % of bisphenol Adiglycidyl ether as a crosslinkable monomer, and 0.4 wt % of an Irgacure 2959 (manufactured by Ciba Specialty Chemicals Inc.) as a photopolymerization initiator to a mixed solvent of NMP and water was applied onto the alignment control film 109 formed on the color filter substrate with a barcoater, and the whole was dried at a temperature of 40° C. and a humidity of 70%. After that, the resultant was irradiated with UV light from a high-pressure mercury lamp at an irradiation energy of about 1 J/cm$^2$. As a result, the built-in polarization plate 150 was formed on the color filter substrate. The absorption axis of the built-in polarization plate 150 was perpendicular to the polarization axis of the polarized UV with which the alignment control film had been irradiated.

The direction in which the liquid crystal molecules were aligned in the TFT substrate and that in the color filter substrate were made substantially parallel to each other, and an angle formed between the direction and the direction of an applied electric field 117 was set to 15°.

Polymer beads having a mean particle diameter of 4 μm as a spacer were dispersed between those substrates. Then, liquid crystal molecules 110 were injected between the TFT substrate and the color filter substrate in a vacuum, and the resultant was sealed with a sealing material composed of a UV-curable resin.

A nematic liquid crystal composition having a positive dielectric anisotropy Δε of +6.2 (1 kHz, 20° C.), a refractive index anisotropy Δn of 0.1068 (at a wavelength of 590 nm and 20° C.), a torsional elastic constant K2 of 7.0 pN, and a nematic-isotropic phase transition temperature T (N-I point) of about 70° C. was used as each of the liquid crystal molecules 110.

The thickness (gap) of the liquid crystal layer was set to 3.8 μm.

The two polarization plates 114 sandwiching the TFT substrate and the color filter substrate were placed in a crossed nicol fashion; provided that the polarization plate 114 on the side of the color filter substrate 102 was placed so that its absorption axis might coincide with the absorption axis of the built-in polarization plate 150.

After that, a driver circuit, a backlight, and the like were connected to the resultant so that a module might be obtained. As a result, an active matrix type liquid crystal display was obtained.

In this example, the liquid crystal display was caused to show the following normally-close characteristic: the liquid crystal display displays a dark image at a low voltage, or displays a bright image at a high voltage.

Next, the liquid crystal display of this example was evaluated for its display quality. As a result, the liquid crystal display was observed to achieve high-quality display having a contrast ratio of 800:1, and simultaneously, was observed to show a wide view angle at the time of the display of a halftone.

COMPARATIVE EXAMPLE 1

A liquid crystal display was produced in exactly the same manner as in Example 4 except that the built-in polarization plate 150 was not formed on the color filter substrate.

The liquid crystal display was evaluated for its display quality. As a result, the liquid crystal display had a contrast ratio of 710:1.

EXAMPLE 5

A specific constitution of Example 5, i.e., a transflective liquid crystal display according to the present invention is described with reference to FIGS. 3 and 4.

The term "transflective liquid crystal display" refers to a liquid crystal display including a transmission portion and a reflection portion in any one of its pixels, and the liquid crystal display can display an image by utilizing ambient light at the reflection portion.

Figure 3:
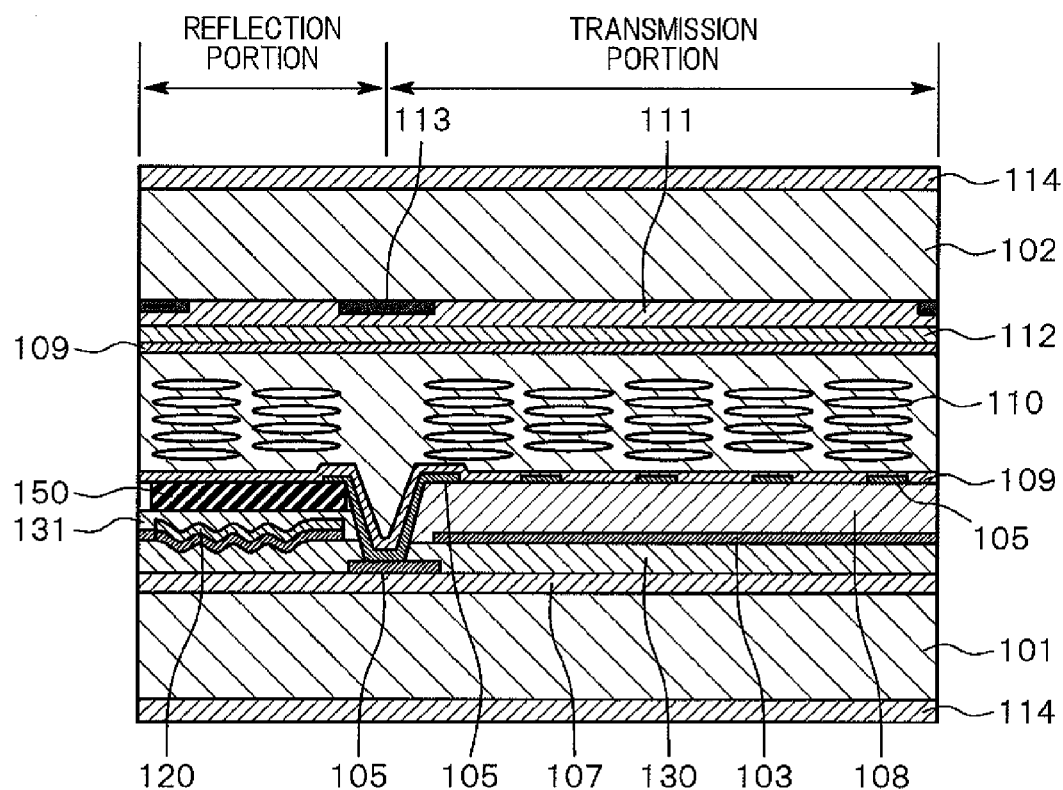
FIG. 3 is a schematic sectional view of a pixel portion of a transflective liquid crystal display according to the present invention.

FIG. 3 is a schematic sectional view of a portion near one pixel for describing the liquid crystal display according to the present invention. In addition, FIG. 4 is a schematic view of an active matrix substrate for describing the constitution of the portion near one pixel for describing the liquid crystal display according to the present invention. FIG. 3 schematically shows a sectional view taken along the line III-III of FIG. 4.

Figure 4:
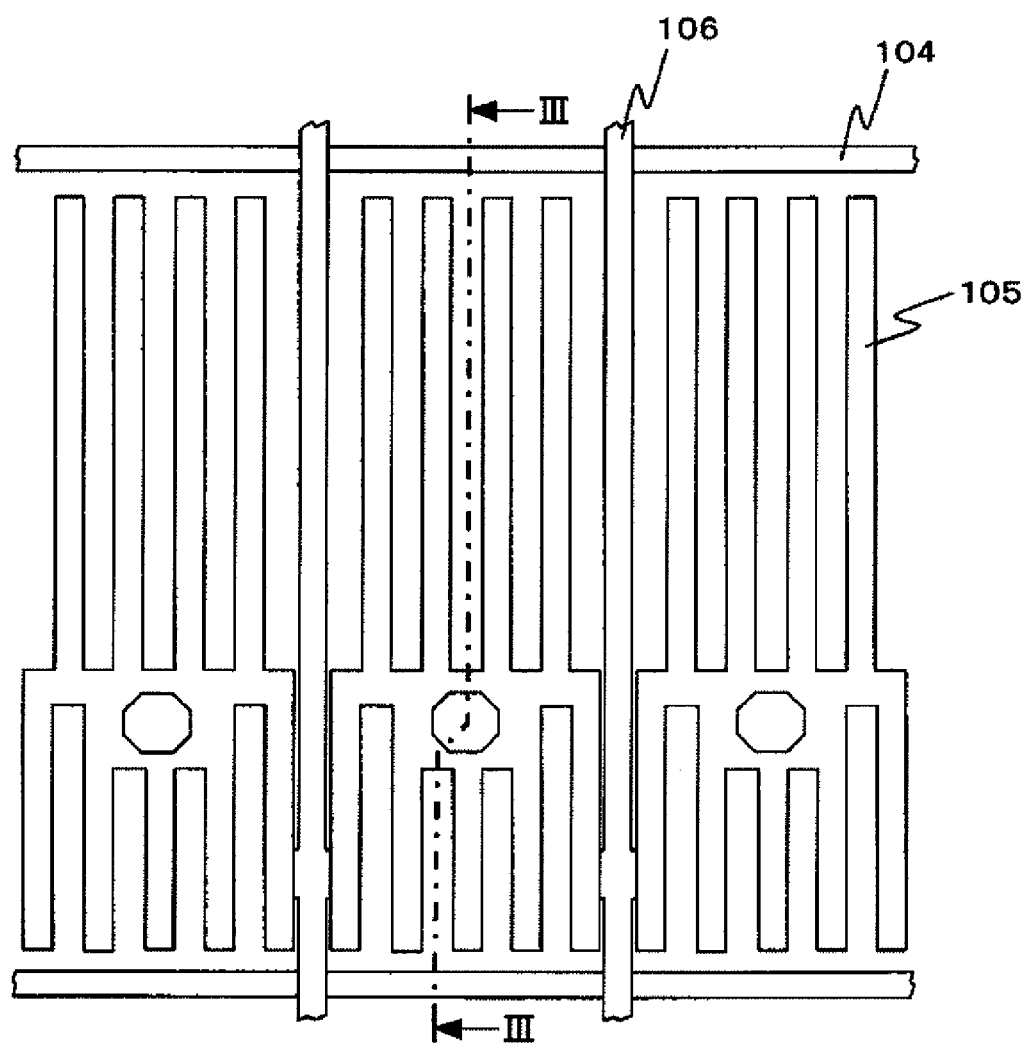
FIG. 4 is a schematic plan view of the pixel portion of the transflective liquid crystal display according to the present invention.

It should be noted that the line III-III of FIG. 4 is not necessarily in a one-to-one correspondence with FIG. 3. For example, the line III-III of FIG. 4 passes along the longitudinal direction of the pixel electrode 105, but FIG. 3 shows the pixel electrode 105 in a comb-tooth fashion.

It should be noted that reference numerals of this example identical to those of Example 4 correspond to the same functional portions.

A glass substrate having a thickness of 0.5 mm and a polished surface is used as the substrate 101 in the production of the liquid crystal display of the present invention.

The insulating film 107 and an insulating film 130 for preventing a short circuit in each of the electrodes 103, 105, 106, and 104, the thin-film transistor 115, and the protective insulating film 108 for protecting the thin-film transistor 115, and the electrodes 105 and 106 are formed on the substrate 101 so that a TFT substrate may be obtained.

The pixel electrode 105 and the common electrode 103 are each formed of ITO, and the common electrode 103 is constituted of a solid electrode covering nearly the entirety of the pixel.

The insulating film 130 was formed of an OPTMER PC (manufactured by JSR Corporation) serving as a photosensitive resin.

Only the reflection portion was subjected to pattern exposure, and was then heated, whereby irregularities were formed on the surface of the reflection portion with the aid of a plasticization of the resin. A reflecting plate 120 was formed of aluminum on the irregularities. The irregularities are needed for reflecting ambient light in various directions.

Next, an alignment control film 131 was formed so as to serve also as a planarizing layer for the irregularities of the reflecting plate 120, and an aligning ability was imparted to the film by a rubbing alignment method.

A solution prepared by adding 8 wt % of C.I. Direct Blue 67, 0.7 wt % of bisphenol A diglycidyl ether as a crosslinkable monomer, and 0.4 wt % of an Irgacure 2959 (manufactured by Ciba Specialty Chemicals Inc.) as a photopolymerization initiator to a mixed solvent of NMP and water was applied onto the alignment control film 131 with a barcoater, and the whole was dried at a temperature of 40° C. and a humidity of 70%.

Next, only the reflection portion was subjected to pattern exposure with UV light from a high-pressure mercury lamp at an irradiation energy of about 1 J/cm$^2$ through a photomask, and was then washed with a solvent, whereby the built-in polarization plate 150 was formed only on the reflection portion.

The insulating film 107 and the protective insulating film 108 are each composed of silicon nitride, and a capacitor element is formed to have such a structure that the insulating film 108 is sandwiched between the pixel electrode 105 and the common electrode 103.

The pixel electrode 105 is placed so as to overlap the upper layer of the solid-shaped common electrode 103. The number of pixels, which are constituted of the 1,024×3 (corresponding to R, G, and B) signal electrodes 106 and the 768 scanning electrodes 104, is 1,024×3×768.

The color filter 111 with the black matrix 113 was formed on the substrate 102, and the resultant was defined as a counter color filter substrate. The ITO 112 was formed into a film on the surface of the color filter.

A polyamide acid varnish was applied onto each of both the TFT and color filter substrates, and the whole was heated at 210° C. for 20 minutes, whereby the alignment control film 109 composed of polyimide and having a thickness of about 110 nm was formed. A liquid crystal-aligning ability was imparted to the alignment control film 109 by subjecting the film to a rubbing treatment.

The direction in which the liquid crystal molecules were aligned in the TFT substrate and that in the color filter substrate were made substantially parallel to each other, and an angle formed between the direction and the direction of the applied electric field 117 was set to 15°.

Polymer beads having a mean particle diameter of 4 μm as a spacer were dispersed between those substrates. Then, the liquid crystal molecules 110 were injected between the TFT substrate and the color filter substrate in a vacuum, and the resultant was sealed with a sealing material composed of a UV-curable resin.

A nematic liquid crystal composition having a positive dielectric anisotropy $\Delta\epsilon$ of +6.2 (1 kHz, 20° C.), a refractive index anisotropy $\Delta n$ of 0.1068 (at a wavelength of 590 nm and 20° C.), a torsional elastic constant K2 of 7.0 pN, and a nematic-isotropic phase transition temperature T (N-I point) of about 70° C. was used as each of the liquid crystal molecules 110.

The thickness (gap) of the liquid crystal layer was set to 3.8 μm.

The two polarization plates 114 sandwiching the TFT substrate and the color filter substrate were placed in a crossed nicol fashion; provided that the polarization plate 114 on the side of the color filter substrate 102 was placed so that its absorption axis might be perpendicular to the absorption axis of the built-in polarization plate 150, and might coincide with the long axis of each of the liquid crystal molecules 110.

Causing the transmission axis of the polarization plate on the side of the color filter to coincide with the short axis direction of each of the liquid crystal molecules is preferable in improving the contrast ratio of the liquid crystal display because the coincidence can weaken the depolarization effect of the liquid crystal molecules.

After that, a driver circuit, a backlight, and the like were connected to the resultant so that a module might be obtained. As a result, an active matrix type liquid crystal display was obtained. In this example, the liquid crystal display was caused to show the following normally-close characteristic: the liquid crystal display displays a dark image at a low voltage, or displays a bright image at a high voltage.

Next, the liquid crystal display of this example was evaluated for its display quality. As a result, the liquid crystal display was observed to achieve high-quality display having a contrast ratio at the reflection portion of 15:1 and a contrast ratio at the transmission portion of 500:1, and simultaneously, was observed to show a wide view angle at the time of the display of a halftone.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display, comprising:
a pair of substrates at least one of which is transparent;
a liquid crystal layer placed between the pair of substrates;
an electrode group for applying an electric field to the liquid crystal layer, the electrode group being formed on at least one substrate of the pair of substrates;
multiple active elements connected to the electrode group; and
an alignment control film placed on at least one substrate of the pair of substrates,
wherein the liquid crystal display is obtained by cross-linking molecules of a dichroism pigment aligned on at least one surface of the alignment control film with a crosslinkable monomer.

2. A liquid crystal display according to claim 1, wherein the alignment control film comprises a rubbing alignment film subjected to a rubbing alignment treatment.

3. A liquid crystal display according to claim 1, wherein the alignment control film comprises a photo alignment film subjected to a photo alignment treatment.

4. A liquid crystal display according to claim 3, wherein the photo alignment film is constituted of a cyclobutane polyimide.

5. A liquid crystal display according to claim 1, wherein the crosslinkable monomer cross-links the molecules of the dichroism pigment with heat.

6. A liquid crystal display according to claim 1, wherein the crosslinkable monomer cross-links the molecules of the dichroism pigment with light.

7. A liquid crystal display according to claim 1, wherein the transparent substrate has birefringence.

8. A liquid crystal display, comprising:
a pair of substrates at least one of which is transparent;
a liquid crystal layer placed between the pair of substrates;
an electrode group for applying an electric field to the liquid crystal layer, the electrode group being formed on at least one substrate of the pair of substrates;
multiple active elements connected to the electrode group;
an alignment control film placed on at least one substrate of the pair of substrates; and
a polarizer provided on at least one surface of the alignment control film, the polarizer being obtained by cross-linking molecules of a dichroism pigment with a crosslinkable monomer and aligning the molecules of the dichroism pigment.

9. A reflective type liquid crystal display, comprising:
a pair of substrates at least one of which is transparent;
a liquid crystal layer placed between the pair of substrates;
an electrode group for applying an electric field to the liquid crystal layer, the electrode group being formed on at least one substrate of the pair of substrates;
multiple active elements connected to the electrode group; and
a reflecting plate formed on the transparent substrate,
wherein an alignment control film is formed on the reflecting plate so that a built-in polarization plate composed of molecules of a dichroism pigment aligned by the alignment control film is formed.

10. A liquid crystal display according to claim 9, wherein the molecules of the dichroism pigment are cross-linked with a crosslinkable monomer.

11. A liquid crystal display according to claim 9, wherein:
irregularities are formed on a surface of the reflecting plate; and
the alignment control film serves also as a planarizing layer for the irregularities.

* * * * *